United States Patent
Roberts

(10) Patent No.: US 9,671,513 B2
(45) Date of Patent: Jun. 6, 2017

(54) SEISMIC IMAGE ACQUISITION USING GHOST COMPENSATION IN KIRCHHOFF MIGRATION

(71) Applicant: CGG SERVICES SA, Massy (FR)

(72) Inventor: Graham Roberts, Forest Row (GB)

(73) Assignee: CGG SERVICES SAS, Massy (FR)

( * ) Notice: Subject to any disclaimer, the term of this patent is extended or adjusted under 35 U.S.C. 154(b) by 207 days.

(21) Appl. No.: 14/550,112

(22) Filed: Nov. 21, 2014

(65) Prior Publication Data
US 2015/0198730 A1 Jul. 16, 2015

Related U.S. Application Data

(60) Provisional application No. 61/925,695, filed on Jan. 10, 2014.

(51) Int. Cl.
*G01V 1/36* (2006.01)
*G01V 1/38* (2006.01)

(52) U.S. Cl.
CPC ............... *G01V 1/364* (2013.01); *G01V 1/38* (2013.01); *G01V 2210/51* (2013.01); *G01V 2210/56* (2013.01)

(58) Field of Classification Search
CPC ...... G01V 1/364; G01V 1/38; G01V 2210/51; G01V 2210/56
USPC ........................................................ 367/7, 24
See application file for complete search history.

(56) References Cited

U.S. PATENT DOCUMENTS 5,596,547 A * 1/1997 Bancroft ................ G01V 1/301
367/50

FOREIGN PATENT DOCUMENTS

FR        EP 2395374 A1 * 12/2011 ............... G01V 1/28

OTHER PUBLICATIONS

F.J. Billette et al., "The 2004 BP Velocity Benchmark", EAGE 67th Conference & Exhibition, Madrid, Spain, Jun. 13-16, 2005, B035.
L. Duan et al., "True Amplitude Reverse Time Migration—From Reflectivity to Velocity and Impedance Perturbations", 75th EAGE Conference & Exhibition incorporating SPE EUROPEC 2013, London, UK, Jun. 10-13, 2013.
N.R. Hill, "Prestack Gaussian-Beam Depth Migration", Geophysics, Jul.-Aug. 2001, pp. 1240-1250, vol. 66, No. 4.
S. Jin et al., "Two-Dimensional Asymptotic Iterative Elastic Inversion", Geophysical Journal International, pp. 1013-1016, 108, No. 2, SI5.6.
M.S. Operto et al., "Can We Quantitatively Image Complex Structures with Rays?", Geophysics, Jul.-Aug. 2000, pp. 1223-1238, vol. 65, No. 4.
G. Roberts et al., "Source and Receiver Ghost Compensation Within a Beam Migration", SEG Annual Meeting, Houston, Texas, Sep. 23-27, 2013, pp. 3667-3671.

(Continued)

*Primary Examiner* — Daniel L Murphy
(74) *Attorney, Agent, or Firm* — Patent Portfolio Builders PLLC

(57) ABSTRACT

Methods and systems for ghost compensation of seismic data in conjunction with Kirchhoff migration are described. Input traces are deghosted by applying a deghost operator thereto across a range of ray parameters, which ray parameters are associated with the Kirchhoff migration. The deghosted traces are buffered and then selected for use in the mapping stage of Kirchhoff migration.

18 Claims, 12 Drawing Sheets

(56) References Cited

OTHER PUBLICATIONS

R. Soubaras, "Deghosting by Joint Deconvolution of a Migration and a Mirror Migration", SEG Annual Meeting, Denver, Colorado, Oct. 17-22, 2010. pp. 3406-3410.
R. Soubaras et al., "Variable Depth Streamer—The New Broadband Acquisition System", SEG Annual Meeting, San Antonio, Texas, Sep. 18-23, 2011, pp. 4349-4353.
R. Soubaras et al., "Variable-Depth Streamer Acquisition: Broadband Data for Imaging and Inversion", SEG Annual Meeting, San Antonio, Texas, Sep. 18-23, 2011, pp. 2364-2368.
P. Wang et al, "Premigration Deghosting for Marine Towed Streamer Data Using a Bootstrap Approach", SEG Annual Meeting, Las Vegas, Nevada, Nov. 4-9, 2012, pp. 1-5.
Y. Zhang et al, "Compensating for Source and Receiver Ghost Effects in Reverse Time Migration", SEG Annual Meeting, Las Vegas, Nevada, Nov. 4-9, 2012, pp. 1-5.
E. Forgues et al., "Parameterization Study for Acoustic and Elastic Ray + Born Inversion", Journal of Seismic Exploration, 1997, pp. 253-277, 6.

\* cited by examiner

SEISMIC IMAGE ACQUISITION USING GHOST COMPENSATION IN KIRCHHOFF MIGRATION

RELATED APPLICATION

The present application is related to, and claims priority from U.S. Provisional Patent Application No. 61/925,695, filed Jan. 10, 2014, entitled "Ghost Compensation in Kirchhoff Migration," to Graham Roberts, the disclosure of which is incorporated herein by reference.

TECHNICAL FIELD

Embodiments of the subject matter disclosed herein generally relate to methods and systems for seismic image acquisition and, more particularly, to mechanisms and techniques for compensating for ghosts during Kirchhoff migration.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves and the collection of reflected/refracted versions of those acoustic waves to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

A significant problem in marine-based seismic data analysis involves how to compensate for ghost effects associated with the free-surface interactions of the acoustic waves which are generated to image the subsurface. Considering first the so-called receiver ghosts, in marine-based seismic data acquisition the up-going acoustic waves reflected from subsurface reflectors are first recorded by the receivers. Next, the acoustic waves continue to propagate to the surface where they are reflected back down and are recorded again by the receivers as ghosts. The reflectivity at the free surface is close to negative one and, based on this property, the down-going acoustic waves have similar amplitudes as the previously described up-going acoustic waves but with an opposite polarity. Accordingly, some of the frequencies in the recorded acoustic wave data are attenuated near the ghost notches and the removal of the receiver ghosts can provide the benefit of infilling the ghost notches and providing higher quality images in terms of frequency band and signal-to-noise ratio.

Similarly, sources create ghosts of their own. For example, when a shot is fired by a source, there is both a direct wave which emanates directly from the source toward the subsurface being imaged, and a wave which is reflected from the ocean's surface toward the subsurface.

Based on both low and high frequency requirements for imaging subtle geologic features, interest has developed for widening the seismic bandwidth associated with marine data acquisition. Bandwidth limitations caused by source and receiver ghosts represent one of the major obstacles to accomplishing the goal of wider seismic bandwidth. The ghosts, both source and receiver, generated by the free surface reflection are angle dependent effects which change both the amplitude and the phase of the wavelets being recorded.

A number of recent efforts for ghost compensation have focused on a combination of acquisition and processing methodologies. For example, R. Soubaras and P. Whiting in their 2011 article entitled "Variable Depth Streamer—The New Broadband Acquisition System," published in the 81st Annual International Meeting, SEG, Expanded Abstracts, pages 4349-4353 and incorporated herein by reference, describes variable depth streamer data acquisition. Further, R. Soubaras in his 2010 article entitled "De-Ghosting by Joint Deconvolution of a Migration and a Mirror Migration," published in the 81st Annual International Meeting, SEG, Expanded Abstracts, pages 3406-3410 and incorporated herein by reference and R. Soubaras and Y. Lafet in their 2011 article entitled "Variable-Depth Streamer Acquisition: Broadband Data for Imaging and Inversion," published in the 81st Annual International Meeting, SEG, Expanded Abstracts, pages 2364-2368 and incorporated herein by reference, describe variable receiver depth which introduces ghost notch diversity that can be handled by new processing techniques. The aforementioned techniques provide a high quality broadband image.

Other efforts have revolved around widening the bandwidth on conventionally acquired marine data, i.e., receivers located at approximately constant shallow depths. These efforts include compensating for the source and receiver ghost before migration as described by P. Wang and C. Peng in their 2012 article entitled "Premigration Deghosting for Marine Towed Streamer Data Using a Bootstrap Approach," published in the 82nd Annual International Meeting, SEG, Expanded Abstracts, ACQ 4.4 and incorporated herein by reference, and compensating for the source and receiver ghost during migration as described by Y. Zhang, G. Roberts and A. Khalil in their 2012 article entitled "Compensating for Source and Receiver Ghost Effects in Reverse Time Migration," published in the 82nd Annual International Meeting, SEG, Expanded Abstracts, SPMI 3.5 and incorporated herein by reference.

Despite these previous efforts it is still desirable to develop new and improved techniques for compensating for the effects of receiver and/or source ghosts in received seismic data in order to improve the image of the subsurface which is developed for a target area in order to better identify regions for potential natural resource exploration.

Accordingly, it would be desirable to provide systems and methods that avoid the afore-described problems and drawbacks associated with bandwidth limitations caused by source and receiver ghosts.

SUMMARY

Methods and systems for ghost compensation of seismic data in conjunction with Kirchhoff migration are described. Input traces are deghosted by applying a deghost operator thereto across a range of ray parameters, which ray parameters are associated with the Kirchhoff migration. The deghosted traces are buffered and then selected for use in the Kirchhoff migration.

According to an embodiment, a method for ghost compensation of seismic data includes applying a deghost operator to input traces of seismic data for a range of ray parameters to generate deghosted traces of seismic data, storing the deghosted traces of seismic data in a memory device, and migrating the seismic data by performing a Kirchhoff migration process on deghosted traces selected from the memory device.

According to another embodiment, a system for ghost compensation of seismic data includes a memory device for storing input traces of the seismic data, and at least one processor for applying a deghost operator to the input traces of seismic data for a range of ray parameters to generate deghosted traces of seismic data, which deghosted traces are also stored in the memory device; and wherein the at least one processor migrates the seismic data by performing a Kirchhoff migration process on deghosted traces selected from the memory device.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of compensating for ghost effects during Kirchhoff migration. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described herein, methods and systems for compensating for ghost effects during Kirchhoff migration are presented. According to one embodiment, this can involve applying a deghosting operator to input traces for a range of source and/or receiver propagation angles to generate deghosted traces which are buffered for use in the subsequent Kirchhoff migration. The deghosted traces are then used to perform the Kirchhoff migration by selecting and mapping samples from a deghosted trace in the buffer, which trace is selected based on computed subsurface source and receiver ray parameters, to a given sub-surface imaging point. The source ray parameter is defined as $$p_s = \frac{\sin\theta_s}{v},$$

where $\theta_s$ is the take-off angle at the source location and v is the velocity of sea water, and the receiver ray parameter is defined as $$p_r = \frac{\sin\theta_r}{v},$$

where $\theta_r$ is the arrival angle at the receiver location.

Figure 1:
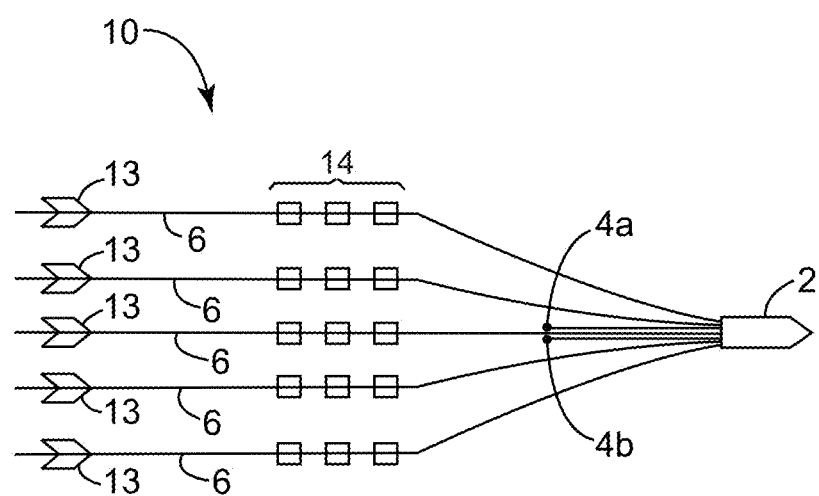
FIGS. 1 and 2 show various aspects of an exemplary marine seismic survey system which can be used to acquire seismic data to be processed in accordance with embodiments.

In order to provide some context for the subsequent exemplary embodiments related to ghost compensation as part of Kirchhoff migration, consider first a seismic data acquisition process and system as will now be described with respect to FIGS. 1 and 2. In FIG. 1, a seismic data acquisition system 10 includes a ship 2 towing a plurality of streamers 6 that can extend one or more kilometers behind the ship 2. Each of the streamers 6 can include one or more birds 13 that maintain the streamer 6 in a known fixed position relative to other streamers 6, and the one or more birds 13 are capable of moving the streamers 6 as desired according to bi-directional communications received by the birds 13 from the ship 2.

One or more source arrays 4a,b can also be towed by ship 2, or another ship, for generating seismic waves. Source arrays 4a,b can be placed either in front of or behind the receivers 14, or both behind and in front of the receivers 14. The seismic waves generated by the source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves then propagate upward and are detected by the receivers 14 disposed on the streamers 6. The seismic waves then reflect off of the free surface, i.e., the surface of the body of water (see FIG. 2, discussed below), traveling downward and are once again detected by the receivers 14 disposed on streamers 6 as receiver ghosts. This process is generally referred to as "shooting" a particular seafloor area, with the seafloor area referred to as a "cell" and the sea surface referred to as a "free surface."

Figure 2:
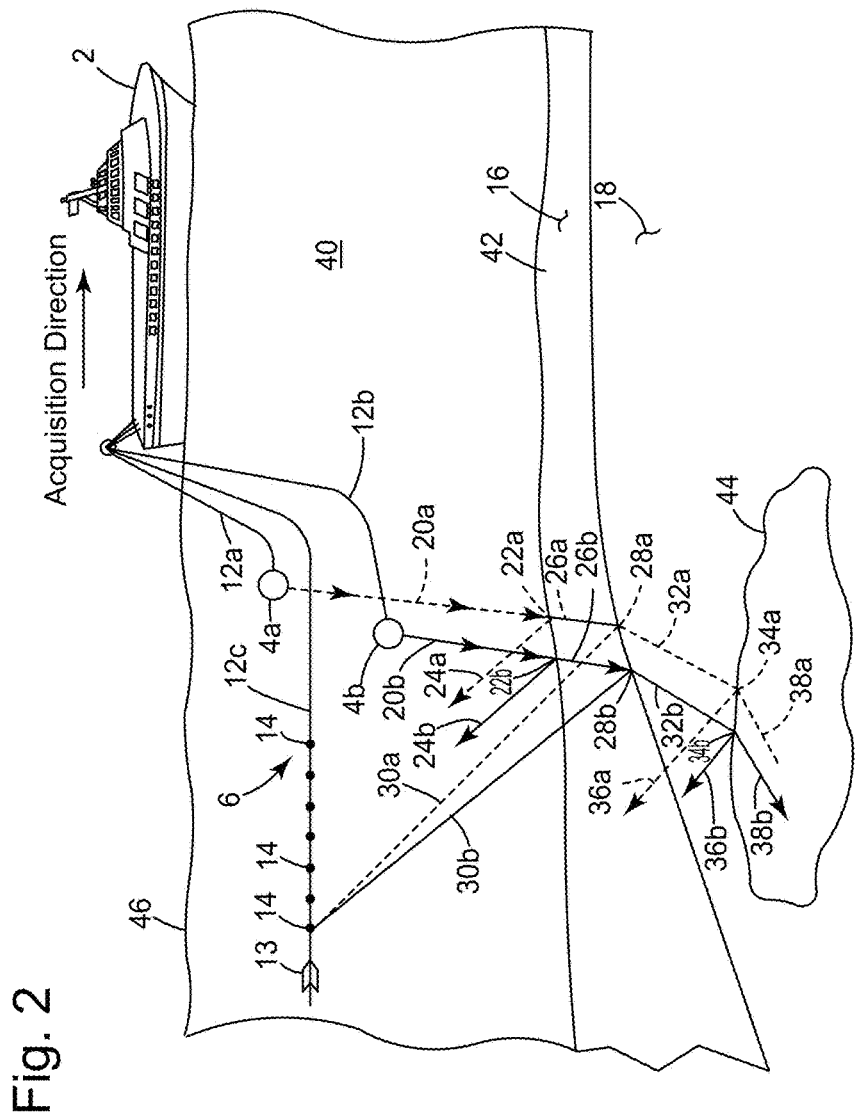

FIG. 2 illustrates a side view of the data acquisition system 10 of FIG. 1. Ship 2, located on sea surface 46, tows one or more streamers 6, wherein the streamers 6 are comprised of cables 12a,b,c and a plurality of receivers 14. Shown in FIG. 2 are two source arrays or streamers, which include sources 4a,b attached to respective cables 12a,b.

More sources could be included in each array, and more or fewer arrays could be included. Sources can be impulsive or non-impulsive.

Each source 4a,b is capable of transmitting a respective sound wave, or transmitted signal 20a,b. For the sake of simplifying the drawings, but while not detracting at all from an understanding of the many principles involved, only a first pair of transmitted signals 20a,b will be shown (even though some or all of sources 4 can be simultaneously (or not) transmitting similar transmitted signals 20). First transmitted signal 20a,b travels through the sea 40 and arrives at first refraction/reflection point 22a,b. First reflected signal 24a,b from first transmitted signal 20a,b travels upward from the seafloor 42, and back to the receivers 14. As those of skill in the art can appreciate, whenever a signal—optical or acoustical—travels from one medium with a first index of refraction $n_1$ and meets with a different medium, with a second index of refraction $n_2$, a portion of the transmitted signal is reflected at an angle equal to the incident angle (according to the well-known Snell's law), and a second portion of the transmitted signal can be refracted (again according to Snell's law).

Accordingly, as shown in FIG. 2, first transmitted signal 20a,b generates first reflected signal 24a,b and first refracted signal 26a,b. First refracted signal 26a,b travels through sediment layer 16 (which can be generically referred to as first subsurface layer 16) beneath ocean floor 42, and can now be considered to be a "new" transmitted signal, such that when it encounters a second medium at second refraction/reflection point 28a,b, a second set of refracted and reflected signals 32a,b and 30a,b are subsequently generated. Further, as shown in FIG. 2, there happens to be a significant hydrocarbon deposit 44 within a third medium, or solid earth/rock layer 18 (which can be generically referred to as second subsurface layer 18). Accordingly, refracted 38a,b and reflected 36a,b signals are generated by the hydrocarbon deposit at the refraction/reflection point 34a,b and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. A surface multiple signal (not shown) is one such example of a multiple, however there are other ways for multiples to be generated. For example, reflections from the surface can travel back down to the receivers and be recorded as ghosts. Multiples do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits. Similarly ghosts, i.e., reflections of primary waves or multiples from the surface of the water which are again recorded by receivers 14, should also be suppressed or removed. In addition, energy which propagates from the source array 4a,b to the free-surface and back into the sea constitutes a source ghost and, as such, should also be suppressed or removed.

The data associated with the received seismic (acoustic) waves is subsequently processed to, for example, generate an image of the subsurface for review by experts to identify potential areas where natural resources may be located. As will be appreciated by those skilled in the art, this processing typically involves a number of different steps or subtypes of processing including, for example, one or more of deconvolution, gathering, stacking and migration. Of particular significance for this particular application is migration, which refers to a process which repositions data elements in the recorded seismic data set in a manner which is intended to make their locations correspond to the locations of their associated reflectors in the subsurface. There are a number of different classes of migration techniques including, for example, integral methods based on Kirchhoff's equation, methods based on solutions in the frequency-wavenumber domain and finite-difference solutions in the time domain. The embodiments described herein combine deghosting with Kirchhoff migration.

Figure 3:
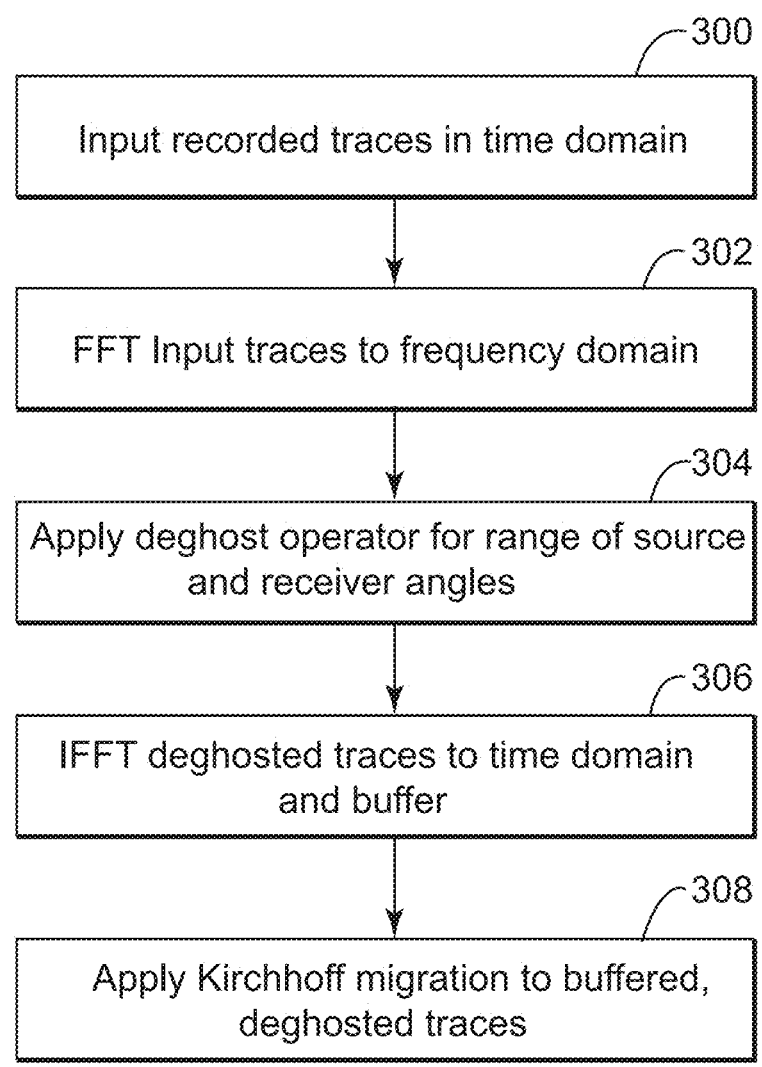
FIG. 3 is a flow diagram depicting a method for deghosting and Kirchhoff migrating seismic data according to an embodiment.

An overview of a method for jointly deghosting and migrating seismic data using Kirchhoff migration according to an embodiment is shown in FIG. 3. Therein, the recorded seismic data is input as traces (optionally subjected first to some previous processing) in the time domain at step 300. As will be appreciated by those skilled in the art, each seismic trace is a set of recorded data associated with a time series of reflections between one source and one receiver in the seismic data acquisition system. The input traces are transformed to the frequency domain by performing Fast Fourier Transforms (FFTs) thereon at step 302. Then, at step 304, a deghosting operator is applied to the frequency domain traces for a range of source and receiver propagation angles to generate deghosted seismic trace data. Step 304 will now be described in more detail.

Figure 4:
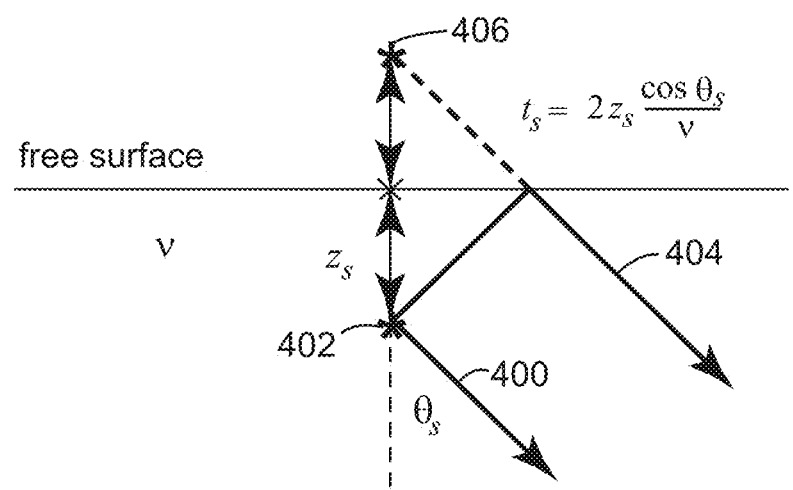
FIG. 4 shows various aspects of primary and ghost wave geometries.

There are various ways to derive the deghost operator to be applied in step 304. As shown in FIG. 4, consider the time delay $t_s$ between two plane waves—one 400 from the actual source 402 and one 404 from its mirror 406, also referred to herein as the source ghost time delay. If the wavefield from an effective source at the free surface is compared with the corresponding combined wavefield from both actual and mirror sources, an extra term is found in the latter which extra term gives the effect of the ghost G as:

$$G(\omega, z_s, \theta_s) = -2i\sin\left(\omega z_s \frac{\cos\theta_s}{v}\right) \quad (1)$$

where $\omega$ is frequency, $z_s$ is the source depth, v is the velocity of sea water, and $\theta_s$ is the take-off angle at the source location. Note that equation (1) assumes zero-phase input data so the above ghost operator of equation (1) includes a depth re-datuming such that the ghost compensation based on this operator collapses side-lobes whilst retaining the original phase of the wavelet. Alternatively, however, a ghost operator can be derived without depth re-datuming that preserves the original kinematics as:

$$G(\omega, z_s, \theta_s) = 1 - \exp\left(2i\omega z_s \frac{\cos\theta_s}{v}\right) \quad (2)$$

Those skilled in the art will appreciate that similar expressions for the receiver ghost can be readily derived which correspond to equations (1) and/or (2) above for the source ghosts. Since the source and receiver depths are given by the seismic acquisition system's predefined geometry, and the velocity of sea water is well known, by accessing the source and receiver ray take-off/arrival angles (or ray parameters) during a migration these embodiments are able to compensate for the ghost effects within the Kirchhoff migration.

Either of the ghost operators shown in equations (1) or (2) can be applied in step 304, for either (or both) of source and/or receiver ghost compensation. For example, a ghosted input trace $D(x_m, \omega)$ can be transformed into a deghosted input trace $D_G(x_m, \omega)$ by calculating either equation (3) or (4) below (using both of the source and receiver ghosting operators associated with equations (1) or (2), respectively):

$$D_G(x_m, \omega) = \frac{D(x_m, \omega)}{-4\sin\left(\omega z_s \frac{\cos\theta_s}{v}\right)\sin\left(\omega z_r \frac{\cos\theta_r}{v}\right)} \quad (3)$$

$$D_G(x_m, \omega) = \frac{D(x_m, \omega)}{\left[1 - \exp\left(2i\omega z_s \frac{\cos\theta_s}{v}\right)\right]\left[1 - \exp\left(2i\omega z_r \frac{\cos\theta_r}{v}\right)\right]} \quad (4)$$

As mentioned above, according to embodiments, these deghosted traces are calculated over a range of source $\theta_s$ and/or receiver $\theta_r$ propagation (take-off or arrival) angles. According to one embodiment, this range can be from 0 to 40 degrees, although the present invention is not limited to this range and other ranges can be used.

Figure 5:
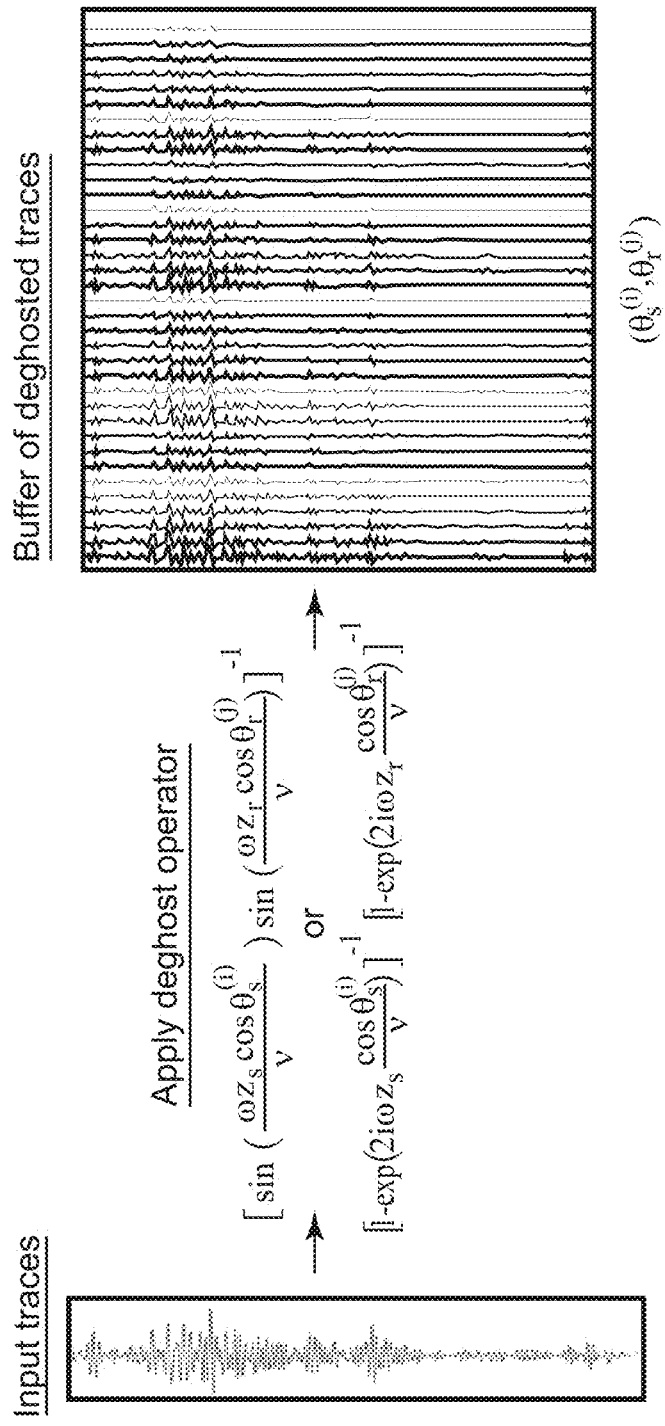
FIG. 5 schematically illustrates a deghosting phase of an embodiment.

Continuing with the method flow of FIG. 3, at step 306 the deghosted traces which have been computed at step 304, are transformed from the frequency domain back into the time domain using an Inverse Fast Fourier transform (IFFT). These time domain, deghosted traces are then stored (buffered) in a memory device (not shown in FIG. 3, see FIG. 12) for usage in step 308 in the Kirchhoff migration process. Steps 300-306 are shown schematically in FIG. 5 (without explicit reference to time/frequency domain transformations).

Figure 6:
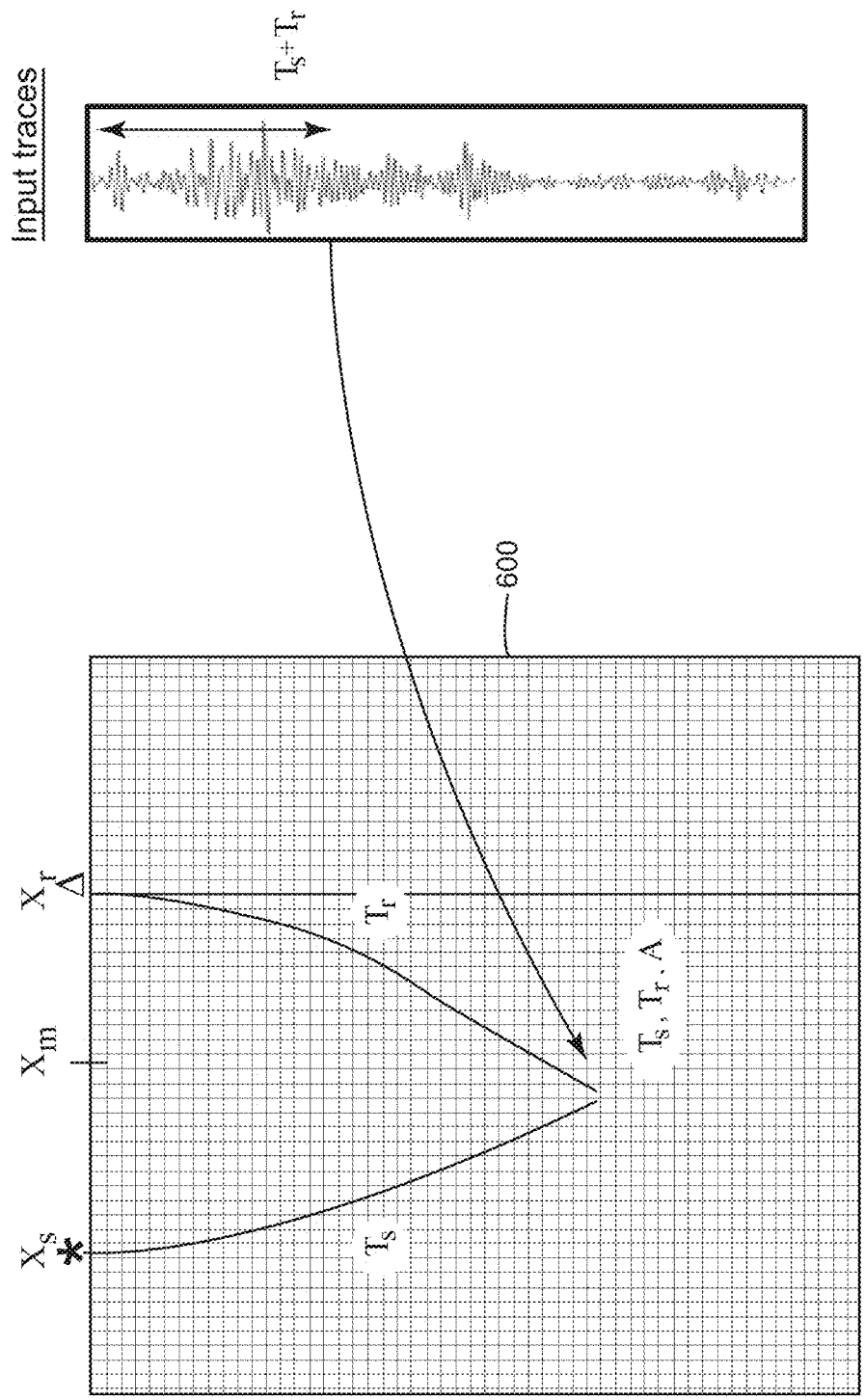
FIG. 6 schematically illustrates conventional Kirchhoff migration.

Conventional Kirchhoff migration involves the mapping of trace samples to subsurface locations defined by the combined source and receiver ray-traced travel times. This process is repeated for all samples of each trace and the amplitudes are summed at subsurface locations. Ray tracing is used to give the source and receiver ray travel times $T_s$ and $T_r$ on a sub-surface grid 600 as shown schematically in FIG. 6. Amplitude correction is also performed at this time by applying an amplitude correction factor A.

Figure 7:
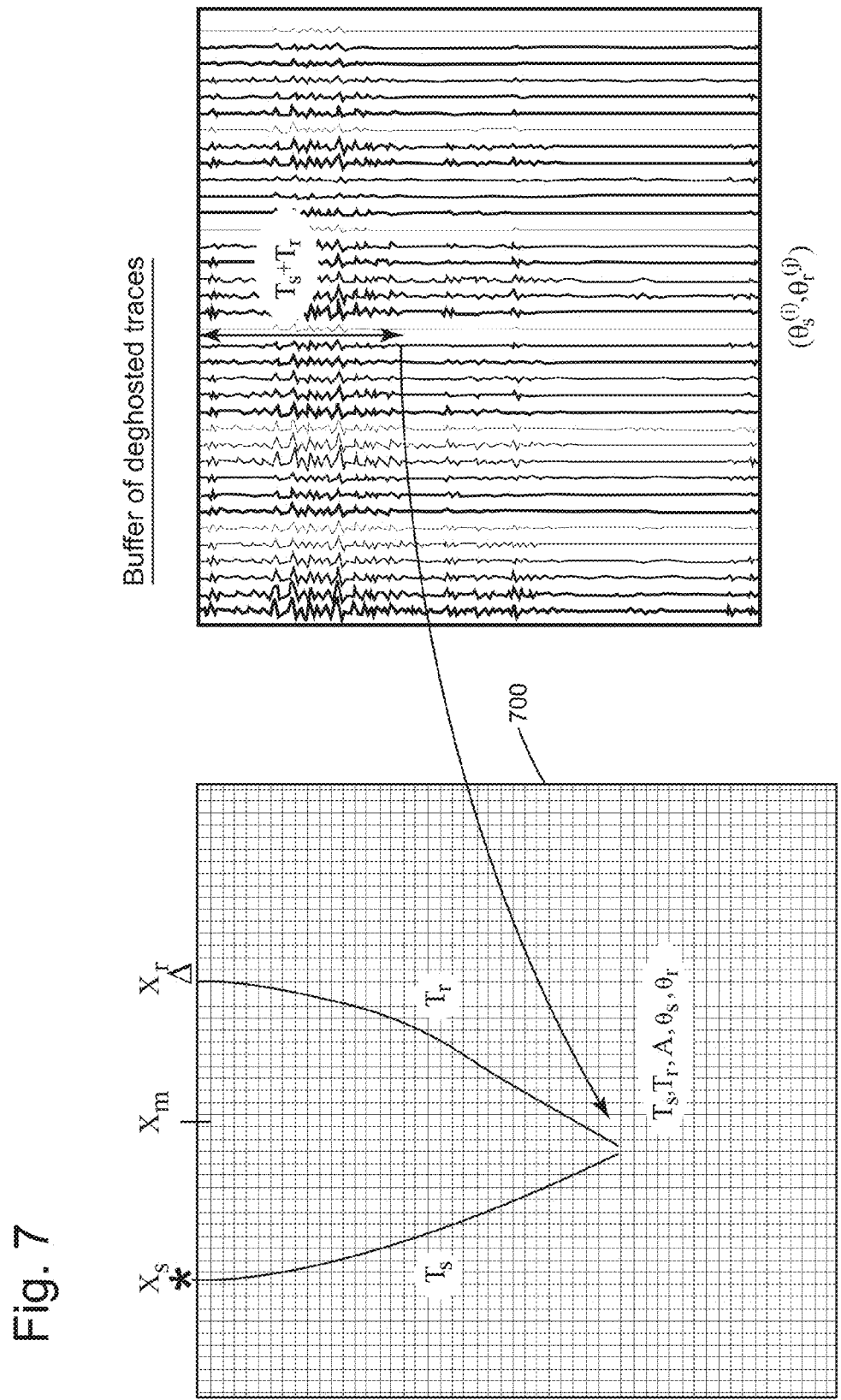
FIG. 7 schematically illustrates a Kirchhoff migration phase operating on deghosted traces according to an embodiment.

However, according to these embodiments, by performing ghost compensation within the Kirchhoff migration process, the source and receiver ray parameters are computed from the sub-surface travel-time maps and are therefore available for use in the deghosting process described above with respect to step 304, enabling a true 3D deghosting. Thus, as shown schematically in FIG. 7, when performing the Kirchhoff migration of step 308 in this embodiment, samples from the appropriate deghosted trace in the buffer are selected and mapped to the grid 700 depending on the source and receiver ray parameter (i.e., $\theta_s$ and $\theta_r$) at the sub-surface imaging points, as well as the ray travel times $T_s$ and $T_r$. Of course, according to other embodiments, if only source or only receiver ghost correction was applied, then the Kirchhoff migration would depend on either $\theta_s$ or $\theta_r$, respectively.

To summarize the joint operation of deghosting and Kirchhoff migration according to embodiments, consider that for each point (x,z) on the grid 700 there are known values for $T_s$, $T_r$, $\theta_s$ and $\theta_r$. From these values, the source ghost time delay $t_s$ and the receiver ghost time delay $t_r$ can be calculated. Thus, for the sample at $T_r+T_s$ on the trace, the corresponding deghost compensation operator can be calculated based on the source and receiver ghost time delays. The source and receiver time delays are given by $$t_s = 2z_s \frac{\cos\theta_s}{v} \text{ and } t_r = 2z_r \frac{\cos\theta_r}{v}$$

respectively (see FIG. 4), and are implicitly included in equations (1) to (4). The deghost compensation operator is then used to generate a plurality of deghosted traces for each input trace associated with a range of ray parameters, which deghosted traces are buffered for later usage in the migration. During the Kirchhoff migration, samples are mapped to the sub-surface location (x,z) where the ray parameters (i.e. $\theta_s$, $\theta_r$) at (x,z) are used to select which trace is used from the buffer of deghosted traces. Note that for simplicity of demonstration of the method in the figures, the deghosting and migration is described with reference to a 2D subsurface described in (x,z) coordinates. All that is described here applies equally to a 3D subsurface described in (x,y,z) coordinates.

Data processing associated with recorded seismic data, i.e., data associated with acoustic or elastic waves returning to receivers which were generated by reflections of waves from the subsurface being imaged, is intended to, among other things, improve the quality of the data for subsequent interpretation. Frequently this interpretation is based on images (printed or displayed) of the subsurface which are intended to show a number of different layers found in the subsurface that was the target of the seismic acquisition. Improving the quality of the data can, for example, result in layers which are more accurately located relative to one another in the generated image, more readily discernable within the generated image or both. Thus, to illustrate some of the benefits of joint deghosting and Kirchhoff migration according to these embodiments, consider the subsurface images shown in FIGS. 8-10.

Figure 8:
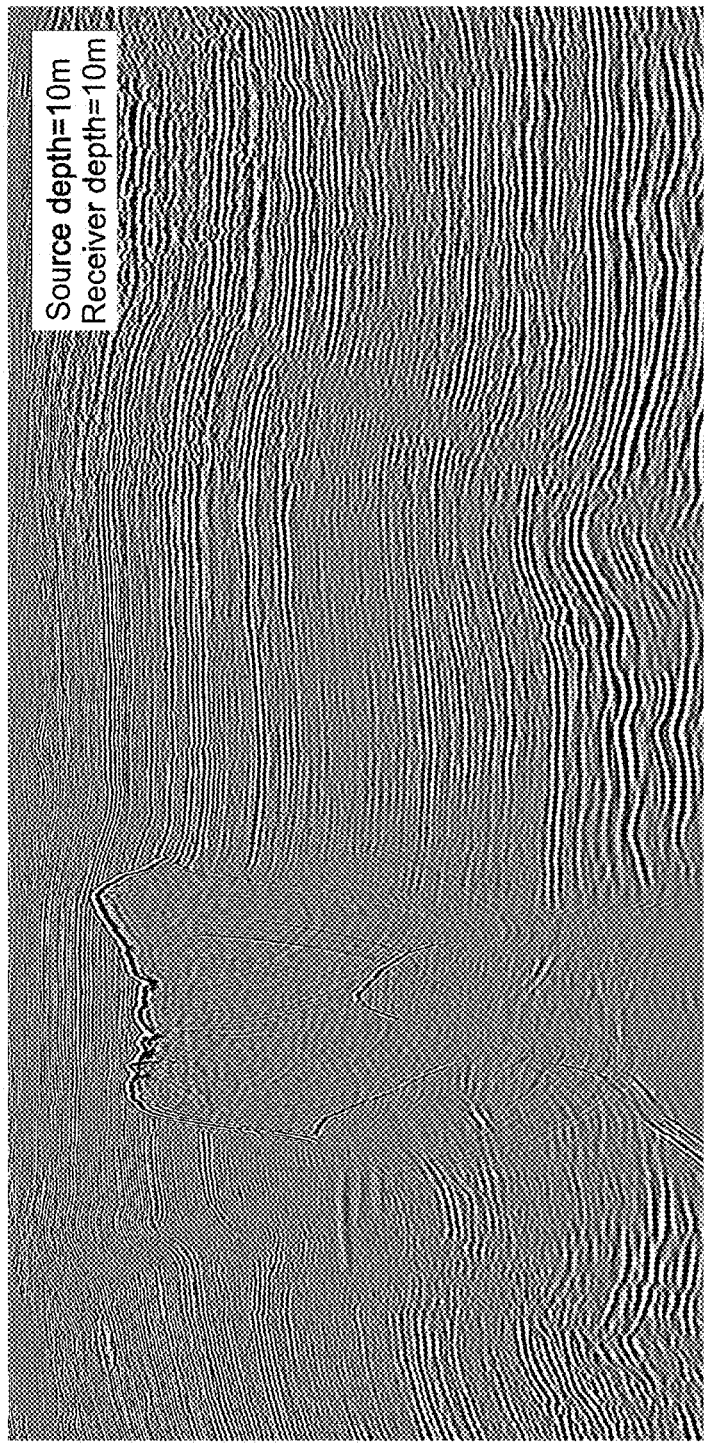
FIGS. 8-10 are images of an illuminated subsurface generated using various datasets and various processing techniques.
Figure 9:
Figure 10:

Using two synthetic seismic data sets, one with no source and receiver ghosts and the other with ghosts for source and receiver depths of 10 meters, various images were generated after different processing was applied to the data sets. FIG. 8 illustrates an image generated using the synthetic data set with ghosts after conventional Kirchhoff migration was applied thereto, but without ghost compensation. FIG. 9 illustrates an image generated using the synthetic data set with ghosts after the modified Kirchhoff migration technique with deghosting has been performed in accordance with these embodiments. A general, visual comparison between FIGS. 8 and 9 reveals that the seismic image generated using embodiments with a combination of deghosting and Kirchhoff migration in FIG. 9 is much clearer with the numerous layers being more pronounced and more easily discerned with the ghost noise removed relative to FIG. 8. FIG. 10 shows a baseline seismic image using the synthetic data set with no ghost input to validate the general accuracy of the image of FIG. 9 based on its similarity thereto.

Figure 11:
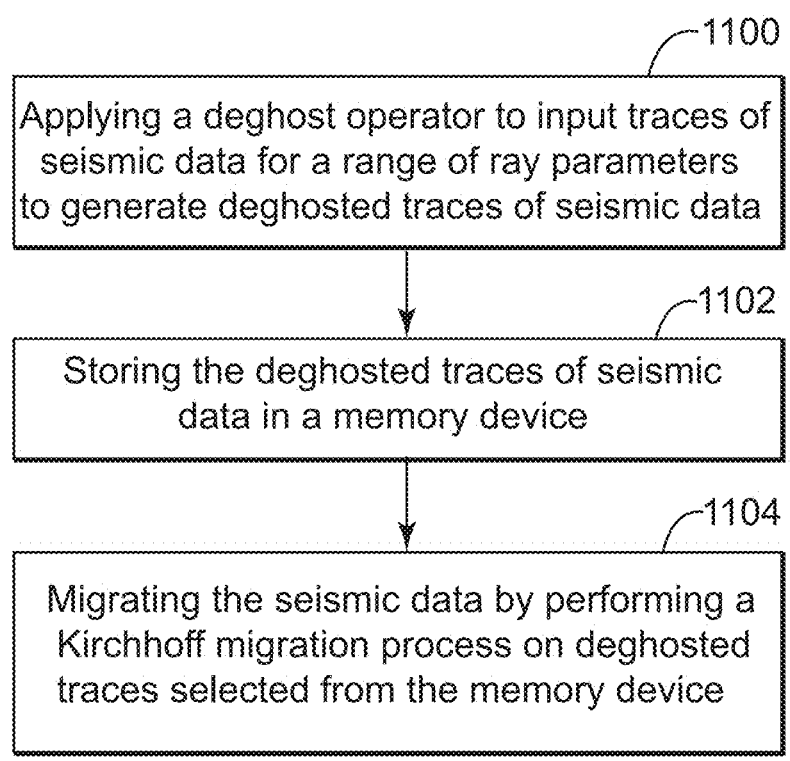
FIG. 11 is a flow diagram of a method according to an embodiment.

The embodiments described herein can be expressed as methods, systems and/or software for performing the combined deghosting and Kirchhoff migration. For example, according to one embodiment, a method for ghost compensation of seismic data, illustrated in the flow diagram of FIG. 11, includes the steps of applying (1100) a deghost operator to input traces of seismic data for a range of ray parameters to generate deghosted traces of seismic data, storing (1102)

the deghosted traces of seismic data in a memory device, and migrating (1104) the seismic data by performing a Kirchhoff migration process on deghosted traces selected from the memory device.

Figure 12:
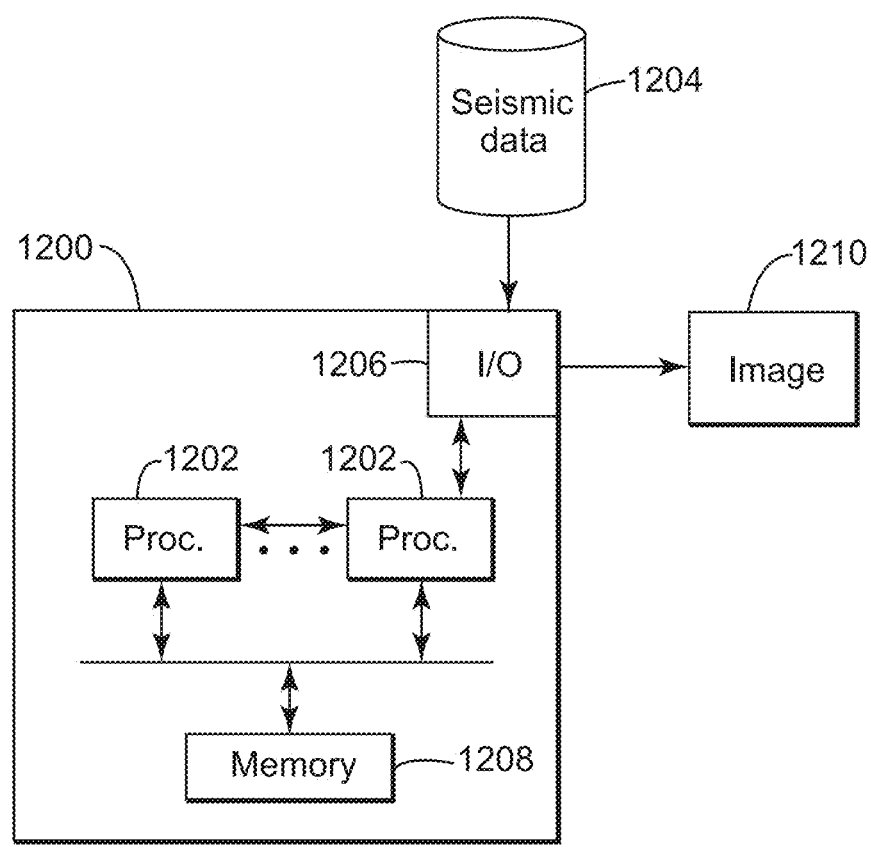
FIG. 12 is a system according to an embodiment.

Similarly a system for processing the raw or partially processed seismic data that has been acquired by a system like that described above with respect to FIGS. 1 and 2 (or other seismic acquisition systems can take many forms such as the computing system 1200 generally illustrated in FIG. 12). Therein, one or more processors 1202 can receive input seismic data 1204 via input/output device(s) 1206. The data can be processed to deghost the input traces as described above during the Kirchhoff migration phase of the seismic data processing and temporarily stored in the memory device 1208 prior to the migration. When the seismic data processing is complete, one or more images 1210 of the subsurface associated with the seismic data can be generated either as a displayed image on a monitor, a hard copy on a printer or an electronic image stored to a removable memory device.

The disclosed embodiments describe, for example, systems and methods for ghost compensation during Kirchhoff migration associated with seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for ghost compensation of seismic data comprising:
   applying a deghost operator to input traces of seismic data for a range of ray parameters to generate deghosted traces of seismic data;
   storing the deghosted traces of seismic data in a memory device;
   migrating the seismic data by performing a Kirchhoff migration process on deghosted traces selected from the memory device; and
   generating an image of a subsurface which was illuminated with seismic waves by a seismic acquisition system to obtain the input traces, using the migrated, deghosted traces.

2. The method of claim 1, further comprising:
   performing a Fast Fourier Transform (FFT) on the input traces prior to applying the deghost operator; and
   performing an Inverse FFT on the deghosted traces prior to storing the deghosted traces in the memory device.

3. The method of claim 1, wherein the deghost operator is calculated using a plurality of parameters that are also used for the Kirchhoff migration.

4. The method of claim 3, wherein the plurality of parameters are a source ray travel time $T_s$, a receiver ray travel time $T_r$, a source take-off angle $\theta_s$, and a receiver arrival angle $\theta_r$, which are used to calculate a source ghost time delay $t_s$ and a receiver ghost time delay $t_r$ from which the deghost operator can be calculated.

5. The method of claim 4, wherein the deghosted traces $D_G(x_m, \omega)$ are calculated as:

$$D_G(x_m, \omega) = \frac{D(x_m, \omega)}{-4\sin\left(\omega z_s \frac{\cos\theta_s}{v}\right)\sin\left(\omega z_r \frac{\cos\theta_r}{v}\right)}$$

where $x_m$ is a midpoint between a source and receiver,
$\omega$ is a frequency,
v is a velocity of sound in water;
$z_s$ is a depth of a source;
$z_r$ is a depth of a receiver;
$\theta_s$ is a take-off angle;
$\theta_r$ is an arrival angle; and
$D_G(x_m, \omega)$ is data with ghosts.

6. The method of claim 4, wherein the deghosted traces $D_G(x_m, \omega)$ are calculated as:

$$D_G(x_m, \omega) = \frac{D(x_m, \omega)}{\left[1 - \exp\left(2i\omega z_s \frac{\cos\theta_s}{v}\right)\right]\left[1 - \exp\left(2i\omega z_r \frac{\cos\theta_r}{v}\right)\right]}$$

where $x_m$ is a midpoint between a source and receiver,
$\omega$ is a frequency,
v is a velocity of sound in water;
$z_s$ is a depth of a source;
$z_r$ is a depth of a receiver;
$\theta_s$ is a take-off angle;
$\theta_r$ is an arrival angle; and
$D_G(x_m, \omega)$ is data with ghosts.

7. The method of claim 1, wherein the step of migrating the seismic data by performing a Kirchhoff migration process on deghosted traces selected from the memory device further comprises the step of:
   mapping samples from the seismic data to a sub-surface location wherein ray parameters at that sub-surface location are used to select which deghosted trace is selected from the memory device.

8. The method of claim 1, wherein applying the deghosting operator removes source ghosts from the seismic data.

9. The method of claim 1, wherein applying the deghosting operator removes receiver ghosts from the seismic data.

10. A system for ghost compensation of seismic data comprising:
    a memory device for storing input traces of the seismic data;
    at least one processor for applying a deghost operator to the input traces of seismic data for a range of ray parameters to generate deghosted traces of seismic data, which deghosted traces are also stored in the memory device; and an output device for generating an image of a subsurface which was illuminated with seismic waves by a seismic acquisition system using the migrated, deghosted traces, wherein the at least one processor migrates the seismic data by performing a Kirchhoff migration process on deghosted traces selected from the memory device.

11. The system of claim 10, wherein the at least one processor is further configured to:

perform a Fast Fourier Transform (FFT) on the input traces prior to applying the deghost operator; and perform an Inverse FFT on the deghosted traces prior to storing the deghosted traces in the memory device.

12. The system of claim 10, wherein the deghost operator is calculated using a plurality of parameters that are also used for the Kirchhoff migration.

13. The system of claim 11, wherein the plurality of parameters are a source ray travel time $T_s$, a receiver ray travel time $T_r$, a source take-off angle $\theta_s$, and a receiver arrival angle $\theta_r$, which are used to calculate a source ghost time delay $t_s$ and a receiver ghost time delay $t_r$ from which the deghost operator can be calculated.

14. The system of claim 13, wherein the deghosted traces $D_G(x_m, \omega)$ are calculated as:

$$D_G(x_m, \omega) = \frac{D(x_m, \omega)}{-4\sin\left(\omega z_s \frac{\cos\theta_s}{v}\right)\sin\left(\omega z_r \frac{\cos\theta_r}{v}\right)}$$

where $x_m$ is a midpoint between a source and receiver,
$\omega$ is a frequency,
v is a velocity of sound in water;
$z_s$ is a depth of a source;
$z_r$ is a depth of a receiver;
$\theta_s$ is a take-off angle;
$\theta_r$ is an arrival angle; and
$D_G(x_m, \omega)$ is data with ghosts.

15. The system of claim 13, wherein the deghosted traces $D_G(x_m, \omega)$ are calculated as:

$$D_G(x_m, \omega) = \frac{D(x_m, \omega)}{\left[1 - \exp\left(2i\omega z_s \frac{\cos\theta_s}{v}\right)\right]\left[1 - \exp\left(2i\omega z_r \frac{\cos\theta_r}{v}\right)\right]}$$

where $x_m$ is a midpoint between a source and receiver,
$\omega$ is a frequency,
v is a velocity of sound in water;
$z_s$ is a depth of a source;
$z_r$ is a depth of a receiver;
$\theta_s$ is a take-off angle;
$\theta_r$ is an arrival angle; and
$D_G(x_m, \omega)$ is data with ghosts.

16. The system of claim 10, wherein the at least one processor performs the migration of the seismic data by performing a Kirchhoff migration process on deghosted traces selected from the memory device by mapping samples from the seismic data to a sub-surface location wherein ray parameters at that sub-surface location are used to select which deghosted trace is selected from the memory device.

17. The system of claim 10, wherein applying the deghosting operator removes source ghosts from the seismic data.

18. The system of claim 10, wherein applying the deghosting operator removes receiver ghosts from the seismic data.

* * * * *